US012540631B2

(12) United States Patent
Dray

(10) Patent No.: US 12,540,631 B2
(45) Date of Patent: Feb. 3, 2026

(54) INTENSIFICATION SYSTEM AND METHOD

(71) Applicant: Kraft Werks Group, LLC, Medina, OH (US)

(72) Inventor: Edward A Dray, Uniontown, OH (US)

(73) Assignee: Kraft Werks Group, LLC, Medina, OH (US)

( * ) Notice: Subject to any disclaimer, the term of this patent is extended or adjusted under 35 U.S.C. 154(b) by 12 days.

(21) Appl. No.: 18/237,335

(22) Filed: Aug. 23, 2023

(65) Prior Publication Data

US 2025/0067283 A1 Feb. 27, 2025

(51) Int. Cl.
*F15B 3/00* (2006.01)
*F04B 9/109* (2006.01)

(52) U.S. Cl.
CPC .............. *F15B 3/00* (2013.01); *F04B 9/1095* (2013.01)

(58) Field of Classification Search
CPC ................................. F15B 3/00; F04B 9/1095
See application file for complete search history.

(56) References Cited

U.S. PATENT DOCUMENTS

| | | | | |
|---|---|---|---|---|
| 3,625,006 | A | 12/1971 | Schoeneben | |
| 3,787,147 | A | 1/1974 | Kostelecky | |
| 4,271,671 | A * | 6/1981 | Smeets | F15B 11/0325 60/578 |
| 4,924,671 | A * | 5/1990 | Reinert | B30B 15/16 91/193 |
| 6,957,567 | B2 * | 10/2005 | Kolbe | G01N 3/12 417/345 |
| 7,263,831 | B2 | 9/2007 | Sawdon et al. | |
| 9,562,544 | B2 | 2/2017 | Clausen et al. | |
| 9,765,786 | B2 * | 9/2017 | Korpela | F04B 41/00 |
| 9,926,947 | B2 | 3/2018 | Villar et al. | |
| 9,938,993 | B2 | 4/2018 | Roberts | |
| 11,261,697 | B2 | 3/2022 | Tusing et al. | |
| 11,703,066 | B2 | 7/2023 | Flatt | |
| 11,913,437 | B2 | 2/2024 | Reukers et al. | |
| 2022/0205462 | A1 | 6/2022 | Diaz | |

FOREIGN PATENT DOCUMENTS

| | | | | |
|---|---|---|---|---|
| CA | 1132441 | A * | 9/1982 | F15B 11/0325 |
| CA | 3072526 | A1 * | 10/2019 | |
| CN | 102518044 | B | 8/2014 | |
| DE | 2718776 | A * | 12/1977 | |
| EP | 1384901 | A1 * | 1/2004 | F04B 11/005 |
| JP | 6078750 | B2 | 2/2017 | |
| WO | 2015036005 | A1 | 3/2015 | |

* cited by examiner

*Primary Examiner* — Nathan C Zollinger

(57) ABSTRACT

An intensifier system comprising at least two intensifiers configured in series, wherein each intensifier in the series is configured to generate a greater pressure in a process medium than the preceding intensifier. A process medium pilot-operated check valve is configured between each intensifier to operate normally as a check valve (e.g., closed) and to operate in a bypass mode when piloted (e.g., open), allowing for both full bypass and enhanced control over a smoother depressurization of the intensifier system without the need for assistance from external devices.

20 Claims, 8 Drawing Sheets

INTENSIFICATION SYSTEM AND METHOD

BACKGROUND

The primary function of an intensifier may be to increase the pressure of a medium, such as a fluid, within a system. Intensifiers may convert a relatively low input fluid pressure to a relatively high output fluid pressure. The input fluid and the output fluid may be the same fluid medium, or they may be different fluid mediums. Common fluid mediums include, water, hydraulic fluid, and sometimes air. Intensifiers may contain pistons, plungers, and the like of various ratios to increase the pressure of the fluid medium. Because pressure varies inversely with surface area, an intensifier may have, for example, two plungers, each having a different surface area. As such, an intensifier may leverage a relatively low-pressure volume of hydraulic fluid acting on a plunger having a relatively large surface area, against a plunger having a relatively small surface area acting on a relatively high-pressure volume of water. As a result, increasing the pressure of the hydraulic fluid creates a proportionately higher pressure increase of the water, where the proportion of this increase is based on the ratio of the input and output plunger surface areas.

However, physical limitations may exist that make it difficult to attain a desired pressure rise with a single intensifier. These limitations may include cost, size, controllability, speed, accuracy, and energy requirements. Accordingly, what is needed is an intensification system and method that overcomes at least some of the limitations noted above.

SUMMARY

In one aspect, an intensification system is provided, comprising: at least two intensifiers configured to fluidly couple in series, each intensifier configured to increase a pressure of a process medium and comprising: a control medium chamber configured to fluidly couple to a control medium inlet and a process medium chamber configured to fluidly couple to both a process medium intensifier inlet and a process medium intensifier outlet, wherein an orientation of the process medium intensifier inlet represents an upstream direction relative to the intensifier and wherein an orientation of the process medium intensifier outlet represents a downstream direction relative to the intensifier; a process medium inlet check valve configured to fluidly couple between the process medium system inlet and the process medium intensifier inlet of the first intensifier in the series; at least one of a process medium pilot-operated check valve, wherein each process medium pilot-operated check valve is configured to fluidly couple between the process medium intensifier outlet of the upstream intensifier and the process medium intensifier inlet of the downstream intensifier; a process medium pilot-operated two-way valve configured to fluidly couple between the process medium system outlet and the process medium intensifier outlet of the last intensifier in the series; and a control system, comprising: at least one control medium power unit configured to fluidly couple to at least one control medium proportional control valve, wherein each of the intensifiers is configured to fluidly couple to one of the control medium proportional control valves; at least one proportional integration regulator, wherein each of the proportional integration regulators is configured to electronically couple to one control medium proportional control valve; and at least one process medium pressure sensor configured to detect a process medium pressure at the process medium system outlet; and a programmable logic controller configured to execute a control system logic comprising a sequence of commands, comprising: during a pressurization phase, pressurizing each of the intensifiers, in sequence from the first intensifier in the series to the last intensifier in the series, wherein each intensifier is pressurized until a process medium pressure reaches the lesser of a process medium test pressure and a process medium transition pressure, wherein the process medium transition pressure is the maximum process medium pressure generated by the intensifier, wherein the process medium pilot-operated check valve that is configured to fluidly couple to the process medium outlet of the intensifier being pressurized is operated in an open position during the pressurization of the intensifier and is operated in a closed position when the intensifier is not being pressurized; during a depressurization phase, depressurizing each of the intensifiers in sequence from the last intensifier in the series to the first intensifier in the series, wherein each intensifier is depressurized until a process medium pressure nears, but does not reach, the process medium transition pressure of the upstream intensifier in the series, wherein the process medium pilot-operated check valve that is configured to fluidly couple to the process medium inlet of the intensifier being depressurized is operated in a closed position during the depressurization of the intensifier and is operated in an open position after the intensifier has been depressurized; and depressurizing all the intensifiers until the process medium pressure reaches zero.

In another aspect, an intensification method is provided, the intensification method comprising: during a pressurization phase, pressurizing a first intensifier until a process medium pressure nears a process medium transition pressure, wherein the process medium transition pressure is the maximum process medium pressure generated by the intensifier; and pressurizing a second intensifier until the process medium pressure reaches a process medium test pressure, wherein a pilot-operated check valve is configured to fluidly couple in series between the first intensifier and the second intensifier, wherein the pilot-operated check valve is operated in an open position during the pressurization of the first intensifier, and wherein the pilot-operated check valve is operated in a closed position during the pressurization of the second intensifier; during a depressurization phase, depressurizing the second intensifier; opening the pilot-operated check valve when the process medium pressure nears, but does not reach, the process medium transition pressure of the first intensifier; and depressurizing both of the intensifiers until the process medium pressure reaches zero.

BRIEF DESCRIPTION OF THE DRAWINGS

The accompanying figures, which are incorporated in and constitute a part of the specification, illustrate various example aspects, and are used merely to illustrate various example aspects. In the figures, like elements bear like reference numerals.

DETAILED DESCRIPTION

Figure 1:
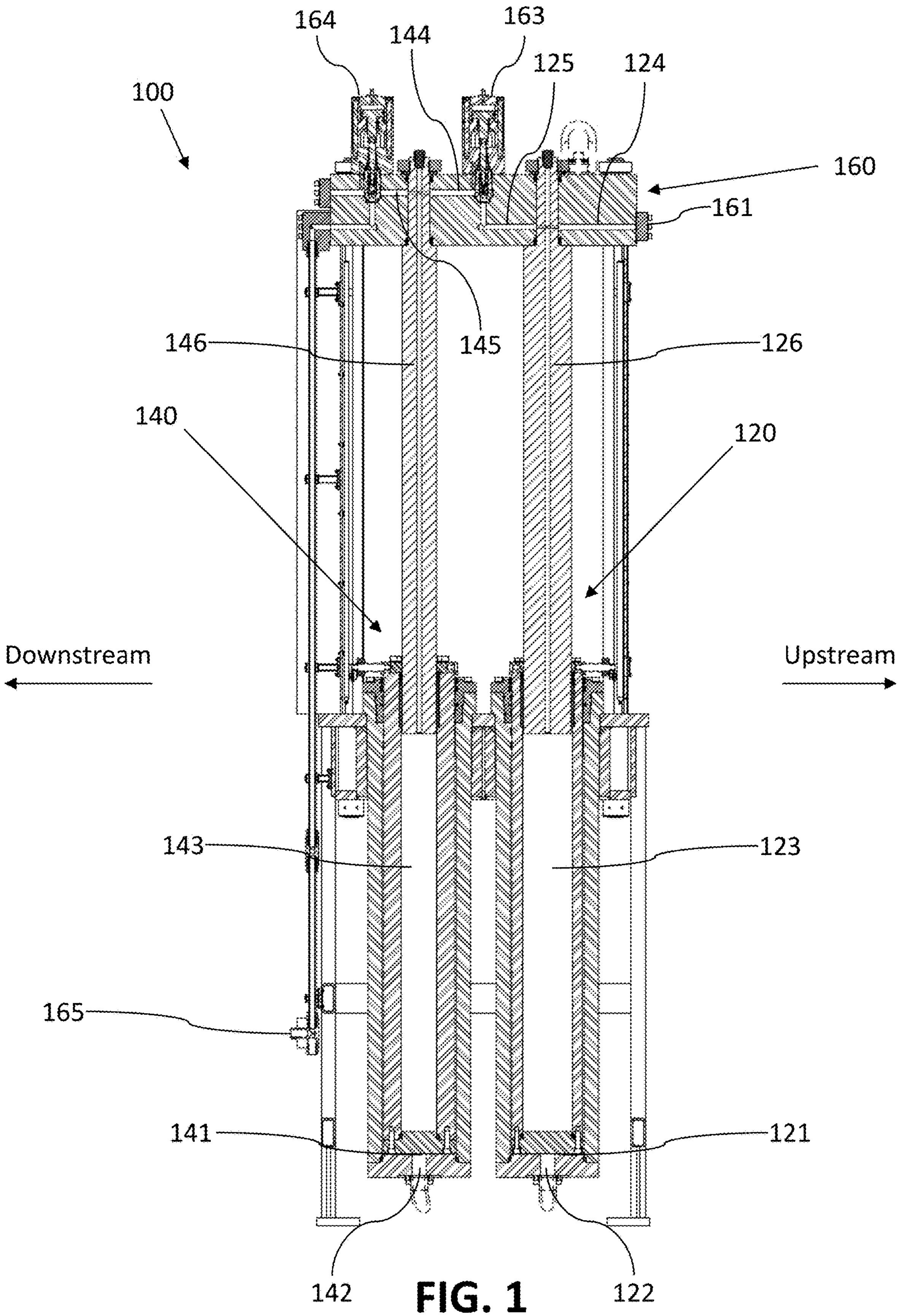
FIG. 1 illustrates a sectional view of an intensification system 100 having an intensifier 120 and an intensifier 140.

FIG. 1 illustrates a sectional view of an intensification system 100 having a first intensifier 120, a second intensifier 140, and an intensifier manifold 160. The intensification system 100 may be configured to accommodate both a control medium and a process medium. The control medium may comprise a medium that substantially resists compression, such as water, a hydraulic fluid, a non-compressible liquid, and the like. The process medium may comprise a medium that substantially resists compression, such as water, a hydraulic fluid, a non-compressible liquid, and the like. The control medium and the process medium may comprise the same medium, or they may comprise different mediums. As a non-limiting example, the control medium may be a hydraulic fluid and the process medium may be water.

The intensification system 100 may comprise a plurality of intensifiers 120, 140. The intensifiers 120, 140 may all be of the same construction. Alternatively, the intensifiers 120, 140 may be of constructions that differ from one another. The type of intensifier construction for each position in the intensification system 100 may be selected based on its suitability for the needs of the particular application. For example, there are currently two common types of intensifiers: a cylinder-type intensifier and a plunger-type intensifier. The cylinder-type intensifier may have a double-acting hydraulic bottom. The extension of a rod may be encapsulated inside a thick-walled housing. A resulting cavity may be pre-filled with a process medium before a cylinder piston advances. The advancement of a cylinder piston may push the rod end into the cavity, thereby causing a displacement of the process medium into a vessel and a resulting increase in the process medium pressure. The cylinder-type intensifier may be economical to build, but it may also have a problem of allowing cross-contamination of the control medium with the process medium across a dynamic rod seal. By contrast, the plunger-type intensifier may have a moving plunger and a fixed position rod. The plunger may provide a direct separation between the control medium and the process medium. The plunger-type intensifier may be more expensive to build than the cylinder-type intensifier due to the greater number of components required to build a plunger-type intensifier, but the plunger-type intensifier may provide for lower downtime and maintenance costs.

The intensifiers 120, 140 may have a control medium chamber 121, 141, respectively. The control medium may enter the control medium chambers 121, 141 through a control medium inlet 122, 142, respectively. As such, the control medium chambers 121, 141 may be configured to fluidly couple to the control medium inlets 122, 142, respectively. The control medium chambers 121, 141 may be configured to receive and contain the control medium. The control medium chambers 121, 141 illustrated in FIG. 1 are shown in an unpressurized state and therefore contain no control medium. As such, the control medium chambers 121, 141 illustrated in FIG. 1 are fully closed and have no volume. The control medium chambers 121, 141 may have a cross-sectional area Ac upon which the control medium transfers a control medium pressure.

The intensifiers 120, 140 may have a process medium chamber 123, 143, respectively. The process medium chambers 123, 143 may be configured to receive and contain the process medium. The process medium chambers 123, 143 may have a cross-sectional area Ap upon that transfers a process medium pressure upon the process medium.

The intensifiers 120, 140 may increase the process medium pressure in proportion to an intensifier amplification ratio Ri of the control medium chambers' 121, 141 cross-sectional area Ac to the process medium chambers' 123, 143 cross-sectional area Ap, such that Ri=Ac/Ap. The intensifier amplification ratio Ri may be any ratio greater than 1 to produce an increase in the process medium pressure across any intensifier in the intensification system 100.

Likewise, each downstream intensifier in the intensification system 100 may increase the process medium pressure of each upstream intensifier. Since each intensifier 120, 140 in the intensification system 100 has an amplification ratio Ri, the pressure increase from an upstream intensifier over a downstream intensifier may be represented by a system amplification ratio Rs, which is a ratio of an intensifier ratio Rid of the downstream intensifier and an intensifier ratio Riu of the upstream intensifier, such that Rs=Rid/Riu. The system amplification ratio Rs of any two adjacent intensifiers in the intensification system 100 may be any ratio greater than 1 to produce an increase in the process medium pressure across the intensification system 100.

Just as the intensifier amplification ratio Ri may be selected based on the process medium pressure requirements of each intensifier, the system amplification ratio Rs may be selected based on the process medium pressure requirements of the intensification system 100. Likewise, the number of intensifiers needed to produce the system amplification ratio Rs may be selected based on the process medium pressure requirements of the intensification system 100.

FIG. 1 illustrates the intensification system 100 comprising two intensifiers 120, 140, but the intensification system 100 may comprise three intensifiers. Likewise, the intensification system 100 may comprise any number of intensifiers. Each intensifier 120, 140 of the intensification system 100 may have a process medium inlet 124, 144 and a process medium outlet 125, 145. The intensification system 100 may have an intensifier manifold 160. The intensifier manifold 160 may be configured to mechanically couple the intensifiers 120, 140 as a single unit. The intensifier manifold 160 may have a process medium system inlet 161 on an upstream side of the intensification system 100. The intensifier manifold 160 may have a process medium system outlet 165 on a downstream side of the intensification system 100. The intensifier manifold 160 may have at least one process medium inlet check valve (not shown). The intensifier manifold 160 may have at least one process medium pilot-operated check valve 163. The intensifier manifold 160 may have at least one process medium pilot-operated two-way valve 164.

Alternatively, the intensification may not have an intensifier manifold 160. As such, the intensifiers 120, 140 may be configured to be mechanically decoupled as separate units. The intensification system 100 having separate intensifier units 120, 140 may have the process medium system inlet 161 on the upstream side of the intensification system 100. The intensification system 100 may have the process medium system outlet 165 on the downstream side of the intensification system 100. The intensification system 100 may have at least one process medium inlet check valve (not shown). The intensification system 100 may have at least one process medium pilot-operated check valve 163. The intensification system 100 may have at least one process medium pilot-operated two-way valve 164.

The components of the intensification system 100 may be configured to fluidly couple so as to allow a process medium to flow downstream through the intensification system from the process medium system inlet 161, through the process medium inlet check valve (not shown), through the first intensifier process medium inlet 124, through the first intensifier process medium chamber 123, through the first intensifier process medium outlet 125, through the process medium pilot-operated check valve 163, through the second intensifier process medium inlet 144, through the second intensifier process medium chamber 143, through the second intensifier process medium outlet 145, through the process medium pilot-operated two-way valve 164, and through the process medium system outlet 165.

The intensifiers 120, 140 may have an intensifier rod 126, 146, respectively. The intensifier rods 126, 146 may be configured to fluidly couple to at least one of: the process medium chambers 123, 143, the intensifier process medium inlets 124, 144, and the intensifier process medium outlets 125, 145. The intensifier rods 126, 146 may have a cross-sectional surface area Ad that is substantially the same as a cross-sectional area Ap of the process medium chambers 123, 143, such that Ad=Ap for a given intensifier. Each intensifier 120, 140 may have a different cross-sectional area Ad and Ap. The upstream intensifiers may have a larger cross-sectional area Ad and Ap than the downstream intensifiers. For example, the intensifier 120 may have a larger cross-sectional area Ad and Ap than the cross-sectional area Ad and Ap of the intensifier 140, such that the intensifier 140 may produce a greater process medium pressure than the intensifier 120. Therefore, the system amplification ratio Rs may be any ratio greater than 1.

The process medium pilot-operated check valve 163 may be configured in a normally closed position and in an open position when piloted. Alternatively, the process medium pilot-operated check valve 163 may be configured in a normally open position and in a close position when piloted.

The process medium pilot-operated check valve 163 may normally function as a standard spring-operated check valve, thereby allowing the intensifier 120 to operate as a traditional intensifier when increasing the process medium pressure. The process medium pilot-operated check valve 163 may have an external bypass cylinder. The external bypass cylinder may be operated by the pilot function of the process medium pilot-operated check valve 163 and may be controlled by a programmable logic controller (not shown).

A pressurization phase (not shown) of an intensification process (not shown) may begin with the intensifier 120 increasing the process medium pressure to a process medium transition pressure, which may be the maximum pressure the intensifier 120 may produce. The pressurization phase may continue with the intensifier 140 increasing the process medium pressure to reach a process medium test pressure. The process medium test pressure may be transferred to a pressure vessel (not pictured) that may be configured to fluidly couple downstream from the process medium system output 165. The pressure vessel may be a tank, a pipe, or the like, and may be configured to contain the pressurized process medium.

The process medium pressure produced by the intensifier 120, 140 may be controlled by a control system (not shown), comprising at least one of: a control medium power unit, a control medium proportional control valve, a proportional integration regulator, a process medium sensor, and the programmable logic controller.

The process medium pilot-operated valve 163 may be configured to operate in a normally closed position, thereby preventing the process medium pressure generated by the intensifier 140 from entering the intensifier 120. When operating both of the intensifiers 120, 140, the process medium pressure in the intensifier 140 may effectively be fluidly coupled to the pressure vessel (i.e., other components may be configured to fluidly couple between the intensifier 140 and the pressure vessel). However, the intensifier 120 may be fluidly separated by the closed process medium pilot-operated check valve 163, and therefore may remain at the process medium transition pressure that the intensifier 120 produced prior to the intensifier 140 being operated. The process medium pressure in the intensifier 120 may be decreased with a reduction of the control medium pressure in the control medium chamber 121 of the intensifier 120.

When the control medium pressure decreases in the control medium chamber 141 of the intensifier 140, the process medium pressure may decrease, as well. The process medium test pressure may only reduce to the process medium transition pressure, as this may be all the process medium volume that the intensifier 140 added to the intensification system 100. A traditional intensification system (not pictured), having two intensifiers fluidly coupled in series with a conventional spring-operated check valve fluidly coupled between the intensifiers, would require an additional process medium dump valve in order to relieve the process medium pressure from the traditional intensification system between a process medium outlet and a fluidly coupled pressure vessel. This is because the process medium pressure can only decrease to a process medium pressure transition pressure due the presence of the spring-operated check valve. If the control medium pressure in the upstream intensifier were to decrease, the process medium pressure downstream of the spring-operated check valve would decrease, but the process medium pressure inside the downstream intensifier and the pressure vessel would remain the same. This is why an additional process medium dump valve is required to evacuate the process medium pressure in the pressure vessel and the downstream intensifier. This additional process medium dump valve can exhibit issues with excessive wear and create a potentially damaging fluid or mechanical shock in the intensification system, since the additional process medium dump valve is traditionally an instant-open valve and does not allow for a smooth transition from a full process medium pressure to a zero process medium pressure.

By contrast, with the addition of the external bypass cylinder built into the process medium pilot-operated check valve 163, it may now be possible to decrease the process medium pressure in both of the intensifiers 120, 140 by energizing a control medium override of the process medium pilot-operated check valve 163, which may lift a check cartridge away from a check seat at a specific process medium pressure in a depressurization phase of the intensification method. This functionality may allow for a full bypass from both of the intensifiers 120, 140. An additional possible advantage may be that the rate of decompression of the intensifiers 120, 140 may be controlled by the control medium proportional control valve configured to fluidly couple to the intensifier control medium inlet 122, 142 and therefore provide for a smooth decrease of the process medium pressure. Additionally, by using the process medium test pressure contained in the intensification system

100, a plunger located in the upstream intensifier 120 and a plunger located in the downstream intensifier 140 may be returned to their respective home positions (i.e., their zero-displacement starting positions, such as when there is substantially no volume of control medium in the control medium chambers 121, 141, as shown in FIG. 1) without the assistance of an external device. For example, by converting a stored energy of the process medium in a controlled volume in the intensification system 100 to a kinetic energy, the plungers in the intensifiers 120, 140 may be returned to their starting positions by the kinetic energy and therefore it may eliminate a need to have external devices to return the plungers to their starting positions and to push the remaining control medium out of the intensification system 100 through the control medium proportional control valves.

Furthermore, in situations where the process medium test pressure value is less than the process medium transition pressure, the process medium pilot-operated check valve 163 may remain in the pilot-operated open position and the upstream intensifier 120 may function as though it would if it were a single intensifier 120 operating without a second intensifier 140.

A benefit of the process medium pilot-operated check valve 163 may be in the depressurization phase when the intensifiers 120, 140 may begin to decompress and return to their zero-displacement starting positions. The process medium stored in the pressure vessel may be returned to the downstream intensifier 140 by means of proportionally expelling the control medium to return the plunger of the downstream intensifier 140 to its zero-displacement starting position. Only a portion of the process medium stored in the pressure vessel may be used to return the plunger of the downstream intensifier 140 to its zero-displacement starting position. The remaining process medium may then be trapped by the low-pressure check valve in a traditional intensification system, but with the process medium pilot-operated check valve 163, the check valve cartridge may be retracted from the check seat and the process medium pressure in both of the intensifiers 120, 140 may be equalized. This pilot-operated bypass function may allow for the process medium remaining in the intensification system 100 to return the plunger of the upstream intensifier 120 to its zero-displacement starting position, thereby exhausting the process medium pressure in the intensification system 100.

During the depressurization phase of the intensification method, a rate of return for the process medium in the intensification system 100 may be proportionally controlled through the same control medium proportional control valves that may be used to transfer the control medium pressure from the control medium power unit to the control medium chambers 121, 141. The rate of return may be proportionally controlled through the position feedback of the plungers in the intensifiers 120, 140 and may allow the programmable logic controller to regulate the control medium proportional control valves at different positions and therefore control the final approach of the plungers to allow for a reduced fluid or mechanical shock in the intensification system 100. Using the same control medium proportional control valves to both pressurize and depressurize the intensifiers 120, 140 may reduce the need for additional control medium components required to provide a low resistance return path for the plungers in the intensifiers 120, 140.

Furthermore, a design, a sizing, and a control of the process medium pilot-operated check valve 163 may be selected in order to prevent a premature shifting of the process medium pilot-operated check valve 163 during the depressurization phase of the intensification method. A control timing of the process medium pilot-operated check valve 163 may be determined based on the design, the sizing, and other parameters to reduce the timing requirements in the programmable logic controller. The process medium pilot-operated check valve 163 may be energized at any time during the depressurization of the downstream intensifier 140, but the process medium pilot-operated check valve 163 may not open until the process medium pressure difference between the downstream intensifier 140 and the upstream intensifier 120 is at a safe, predetermined value. As a result, the release timing of the process medium pilot-operated check valve 163 may be non-critical and may provide for a smooth and consistent transition that is independent of both the process medium test pressure and the size of the intensification system's 100 control medium volume.

The process medium pilot-operated two-way valve 164 may be configured in a normally closed position and in an open position when piloted. Alternatively, the process medium pilot-operated two-way valve 164 may be configured in a normally open position and in a closed position when piloted.

Figure 2:
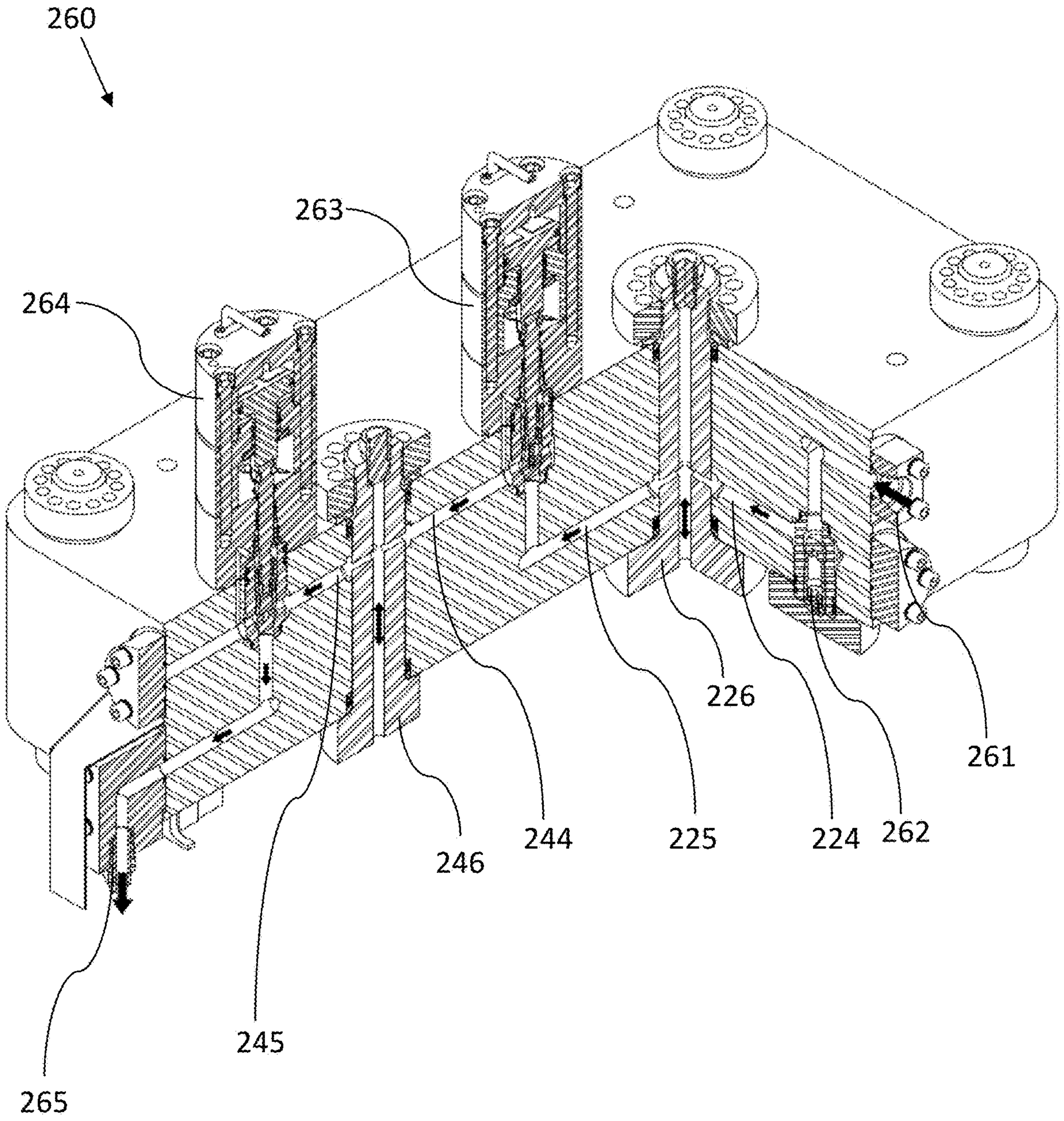
FIG. 2 illustrates a sectional view of an intensifier manifold 260.

FIG. 2 illustrates a section view of an intensifier manifold 260 having a process medium system inlet 261 configured to fluidly couple to a process medium inlet check valve 262, which may be configured to fluidly couple to a first intensifier process medium inlet 224, which may be configured to fluidly couple to a first intensifier process medium chamber (not shown) through a first intensifier rod 226, which may be configured to fluidly couple to a first intensifier process medium outlet 225, which may be configured to fluidly couple to process medium pilot-operated check valve 263, which may be configured to fluidly couple to a second intensifier process medium inlet 244, which may be configured to fluidly couple to a second intensifier process medium chamber (not shown) through a second intensifier rod 246, which may be configured to fluidly couple to a second intensifier process medium outlet 245, which may be configured to fluidly couple to a process medium pilot-operated two-way valve 264, which may be configured to fluidly couple to a process medium system outlet 265.

Figure 3:
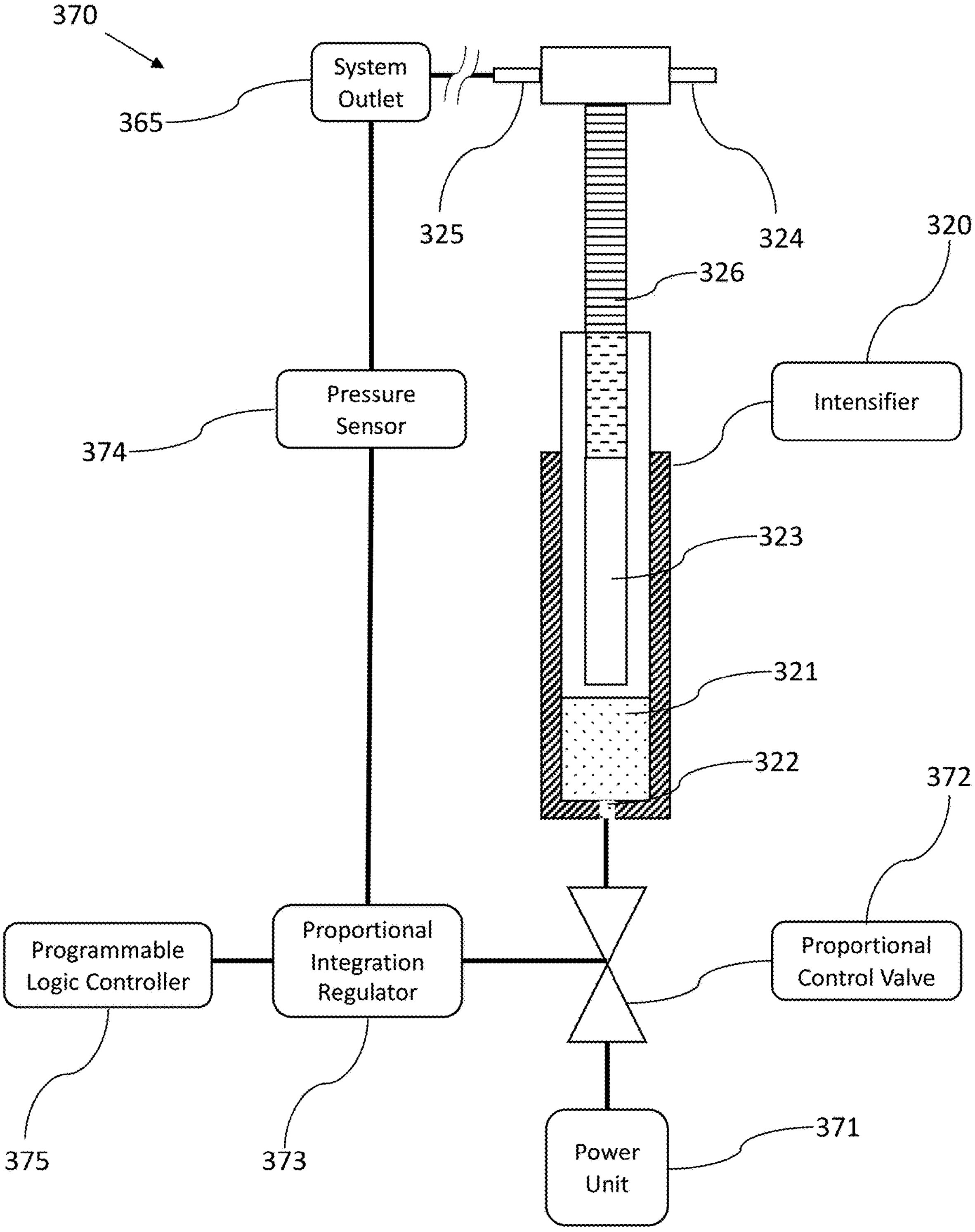
FIG. 3 illustrates a schematic of an intensification control system 370 and a sectional view of an intensifier 320.

FIG. 3 illustrates a schematic of an intensification control system 370 and a sectional view of an intensifier 320 of an intensification system (not shown). Though FIG. 3 illustrates the intensifier 320, the components and concepts illustrated in FIG. 3 also apply to each of the intensifiers in the intensification system. The intensifier 320 may have a control medium chamber 321 that may be configured to fluidly couple to an intensifier control medium inlet 322. The intensifier 320 may have a process medium chamber 323 that may be configured to fluidly couple to an intensifier process medium inlet 324 and an intensifier process medium outlet 325. The intensification system may have an intensification system outlet 365 that may be fluidly coupled to a process medium pilot-operated two-way valve (not shown). The intensifier 320 may have an intensifier rod 326 through which the process medium may flow from the intensifier process medium inlet 324, through the process medium chamber 323, and through the intensifier process medium outlet 325.

The intensification control system 370 may have at least one control medium power unit 371, each of which may be configured to pressurize a control medium. The at least one control medium power unit 371 may comprise a motor and pump assembly configured to pressurize a control medium, such as water or hydraulic oil. The at least one control medium power unit 371 may be configured to fluidly couple to at least one control medium proportional control valve 372, which may be configured to fluidly couple to the intensifier control medium inlet 322. The at least one control medium proportional control valve 372 may also be configured to electrically couple to a proportional integration regulator 373, which may be configured to electrically couple to a programmable logic controller 375. The intensification system 370 may have at least one process medium pressure sensor 374, which may be configured to fluidly couple to the process medium system outlet 365 and to electrically couple to at least one of the proportional integration regulator 373 and the programmable logic controller 375.

The programmable logic controller 375 may be any computer configured to electrically couple with a plurality of input and output devices. The programmable logic controller 375 may be configured to execute a control system logic comprising at least one command. The programmable logic controller 375 may be configured to execute a control system logic comprising a sequence of commands. Programmable logic controllers are well known in the art and the programmable logic controller 375 is not particularly limited.

Figure 4:
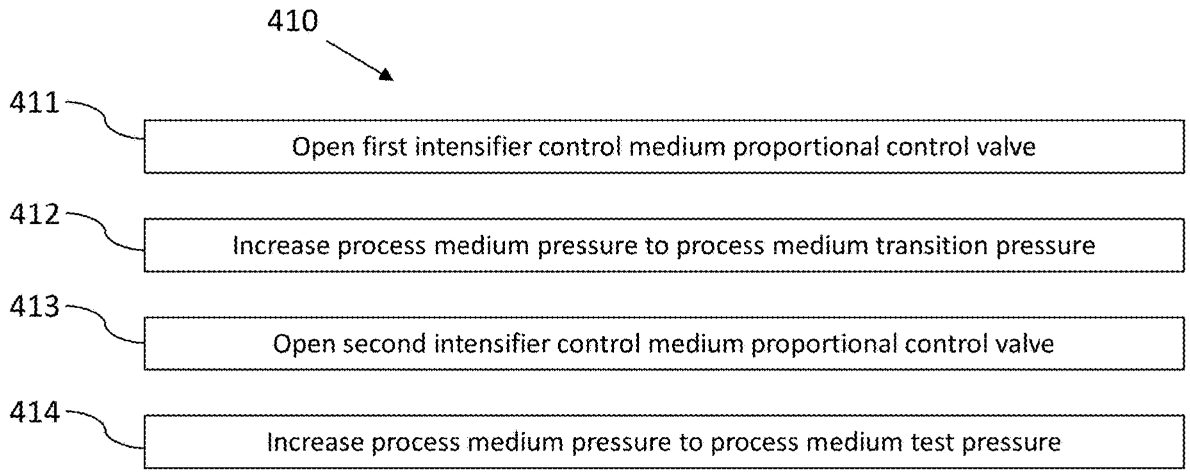
FIG. 4 illustrates a diagram of a pressurization phase 410 of an intensification method.

FIG. 4 illustrates a diagram of a pressurization phase 410 of an intensification method (not shown). The intensification method may comprise the pressurization phase 410, a maintenance phase (not shown), and a depressurization phase (not shown). The pressurization phase 410 may be programmed in a programmable logic controller (not shown) as a control system logic comprising a sequence of commands. Each of the commands may instruct the programmable logic controller to execute at least one step of the pressurization phase 410. The programmable logic controller may be configured to execute the sequence of commands to control various components of an intensification system (not shown). For example, the programmable logic controller may be configured to electrically couple to a proportional integration regulator (not shown), which may be configured to electrically couple to a control medium proportional control valve (not shown), which may be configured to fluidly couple to an intensifier (not shown). As a result, the programmable logic controller may be able to increase the pressure in the intensifier upon opening the control medium proportional control valve.

During the pressurization phase 410, opening a first intensifier control medium proportional valve 411 may allow the process medium pressure to increase. During the pressurization phase 410, increasing the process medium pressure until reaching a process medium transition pressure of a first intensifier 412, then opening a second intensifier control medium proportional control valve 413 and increasing the process medium pressure until reaching a process medium test pressure 414.

Figure 5:
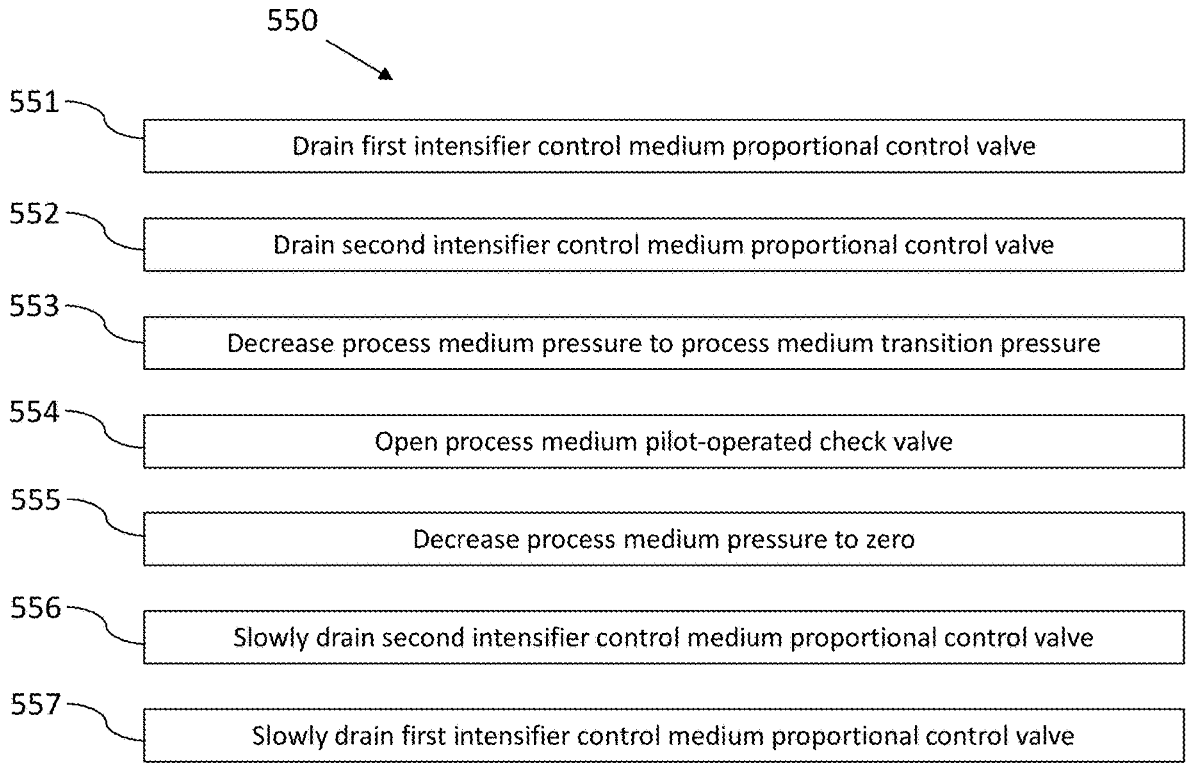
FIG. 5 illustrates a diagram of a depressurization phase 550 of an intensification method.

FIG. 5 illustrates a diagram of a depressurization phase 550 of an intensification method (not shown). The intensification method may comprise the pressurization phase (not shown), a maintenance phase (not shown), and the depressurization phase 550. The depressurization phase 550 may be programmed in a programmable logic controller (not shown) as a control system logic comprising a sequence of commands. Each of the commands may instruct the programmable logic controller to execute at least one step of the depressurization phase 550. The programmable logic controller may be configured to execute the sequence of commands to control various components of an intensification system (not shown). For example, the programmable logic controller may be configured to electrically couple to a proportional integration regulator (not shown), which may be configured to electrically couple to a control medium proportional control valve (not shown), which may be configured to fluidly couple to an intensifier (not shown). As a result, the programmable logic controller may be able to increase the pressure in the intensifier upon opening the control medium proportional control valve.

During the depressurization phase 550, draining a first intensifier control medium proportional control valve 551 and draining a second intensifier control medium proportional control valve 552 may allow a process medium pressure to decrease across a plurality of intensifiers (not shown) of the intensification system until a process medium pressure reaches a process medium transition pressure 553. Draining the control medium proportional control valves may be accomplished by receiving an appropriate control signal from the programmable logic controller, such that the control medium proportional control valves are configured to: open to the intensifiers and therefore increase the process medium pressure of the intensifier when receiving a positive control signal; open to a drain and therefore decrease the process medium pressure of the intensifier when receiving a negative control signal; and close and therefore not affect the process medium pressure of the intensifiers. During the depressurization phase 550, comprising opening a process medium pilot-operated check valve 554 and decreasing the process medium pressure to zero 555. During the depressurization phase 550, slowly draining the second intensifier control medium proportional control valve 556 and slowly draining the first intensifier control medium proportional control valve 557 may allow a plunger (not shown) in each of the first intensifier and the second intensifier to smoothly return to a zero-displacement starting position without creating a damaging fluid or mechanical shock to the intensification system. The rate of flow of the control medium proportional control valves may be adjusted my varying the magnitude of the control signal, such that a small negative control signal may cause the control medium proportional control valves to slowly drain the intensifiers, while a large positive control signal may cause the control medium proportional valves to quickly fill the intensifiers.

Figure 6:
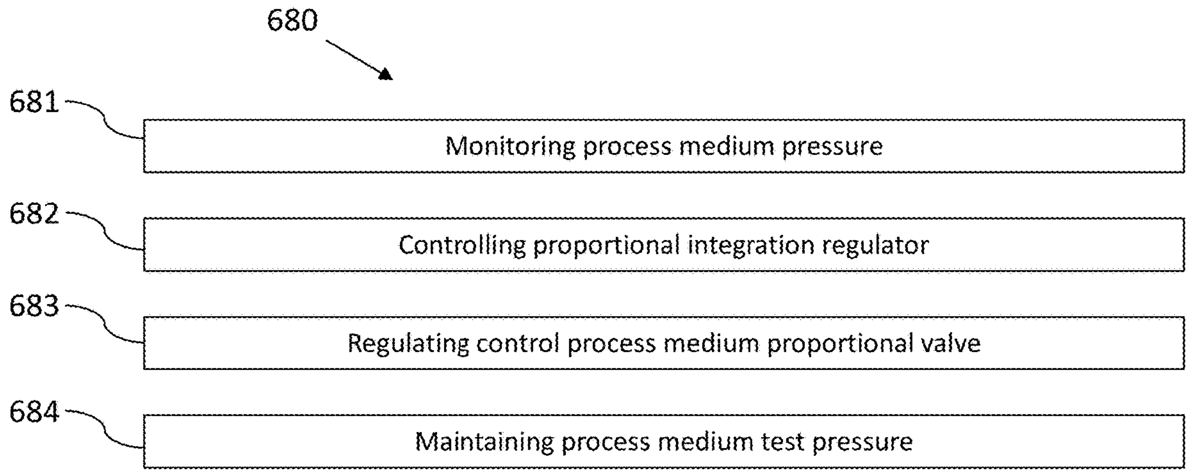
FIG. 6 illustrates a diagram of a maintenance phase 680 of an intensification method.

FIG. 6 illustrates a diagram of a maintenance phase 680 of an intensification method (not shown). The intensification method may comprise a pressurization phase (not shown), the maintenance phase 680, and a depressurization phase (not shown). The maintenance phase 680 may be programmed in a programmable logic controller (not shown) as a control system logic comprising a sequence of commands. Each of the commands may instruct the programmable logic controller to execute at least one step of the maintenance phase 680. The programmable logic controller may be configured to execute the sequence of commands to control various components of an intensification system (not shown). For example, the programmable logic controller may be configured to electrically couple to a proportional integration regulator (not shown), which may be configured to electrically couple to a control medium proportional control valve (not shown), which may be configured to fluidly couple to an intensifier (not shown). As a result, the programmable logic controller may be able to increase the pressure in the intensifier upon opening the control medium proportional control valve.

During the maintenance phase 680, comprising monitoring a process medium pressure 681 and controlling a proportional integration regulator 682 configured for regulating a control process medium proportional control valve 683 and thereby maintaining the process medium test pressure 684. The control medium proportional control valve (not shown), when in an open position, may control an intensifier (not shown) to increase the process medium pressure in the intensification system. The control medium proportional control valve, when in a closed position, may control the intensifier to decrease the process medium pressure in the intensification system. Therefore, the programmable logic controller may maintain the process medium pressure at the process medium test pressure by operating the process medium proportional control valve.

Figure 7A:
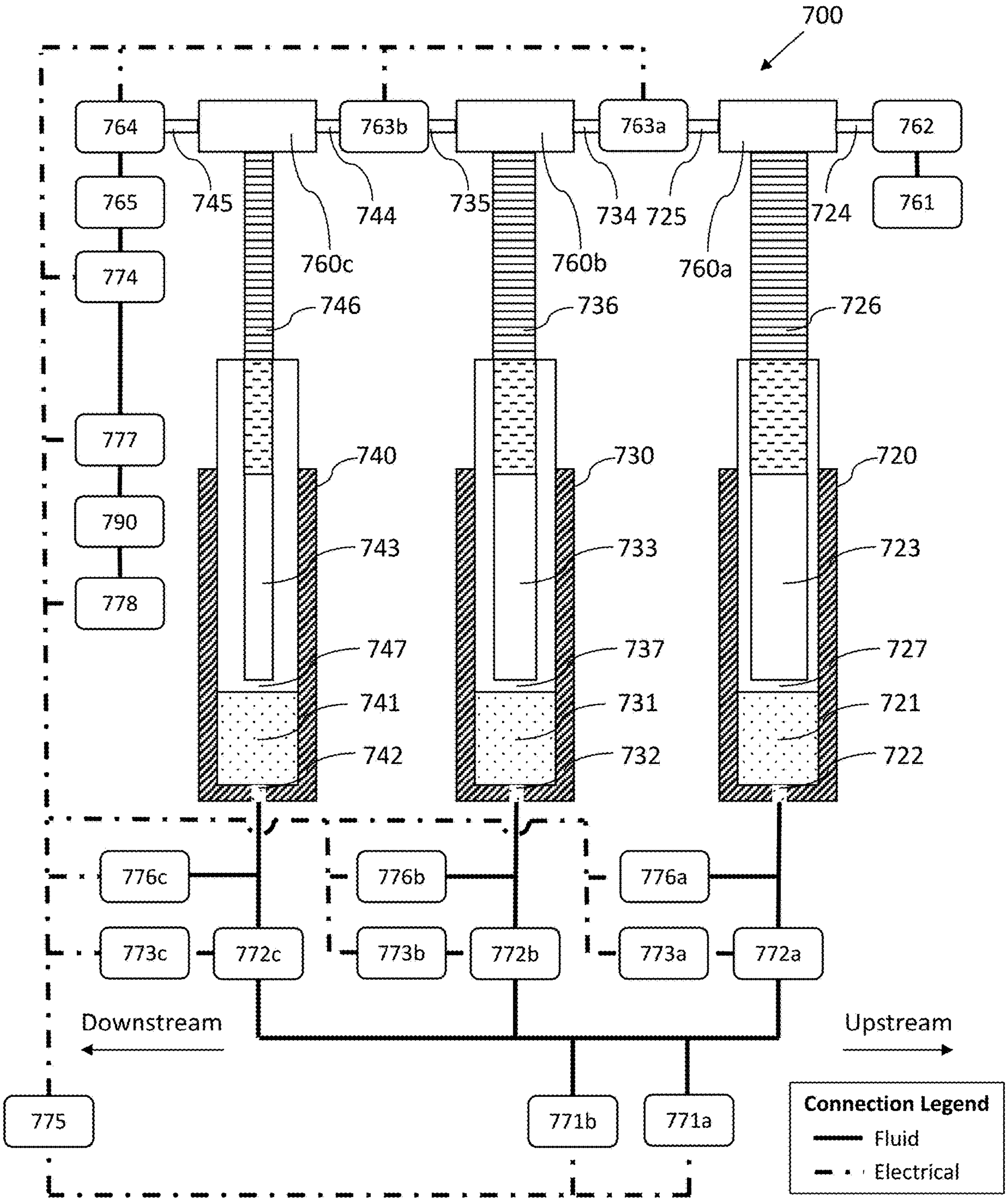
FIG. 7a illustrates a schematic of an intensification system 700 and a sectional view of intensifiers 720, 740, and 780.

FIG. 7*a* illustrates a schematic of an intensification system 700 and a sectional view of the intensifiers 720, 730, 740. The intensification system may have an intensifier manifold 760, which may be configured to mechanically couple the intensifiers 720, 730, 740 into a single unit. Alternatively, the intensifiers 720, 730, 740 may be configured to mechanically couple as a single unit by a means other than the intensifier manifold 760, such as by a plurality of frame structures, fasteners, and the like. Each of the intensifiers 720, 730, 740 may be mechanically decoupled as separate units. Each of the intensifiers 720, 730, 740 may have their own intensifier manifolds 760*a*, 760*b*, 760*c*.

The intensification system 700 may have a process medium system inlet 761, which may be oriented in an upstream position of the intensification system 700 and may be configured to fluidly couple to a process medium inlet check valve 762, which may be configured to fluidly couple to a process medium intensifier inlet 724. The intensification system 700 may have a process medium system outlet 765, which may be oriented in a downstream position of the intensification system 700 and may be configured to fluidly couple to a process medium pilot-operated two-way valve 764, which may be configured to fluidly couple to a process medium intensifier outlet 745.

The intensification system 700 may have at least one control medium power unit 771*a*, 771*b*, which may be configured to fluidly couple to at least one control medium proportional control valve 772*a*, 772*b*, 772*c*. The control medium proportional control valve 772*a* may be configured to fluidly couple to both a control medium inlet 722 of the intensifier 720 and a control medium drain valve 776*a*. The control medium proportional control valve 772*b* may be configured to fluidly couple to both a control medium inlet 732 of the intensifier 730 and a control medium drain valve 776*b*. The control medium proportional control valve 772*c* may be configured to fluidly couple to both a control medium inlet 742 of the intensifier 740 and a control medium drain valve 776*c*.

The intensifiers 720, 730, 740 may have a control medium chamber 721, 731, 741 configured to fluidly couple to the control medium inlet 722, 732, 742. The control medium chamber 721, 731, 741 may have a cross-sectional area Aca, Acb, Acc and may be configured to contain a control medium. The intensifiers 720, 730, 740 may have a process medium chamber 723, 733, 743 which may have a cross-sectional area Apa, Apb, Apc and may be configured to fluidly couple to both a process medium intensifier inlet 724, 734, 744 and a process medium intensifier outlet 725, 735, 745 through an intensifier rod 726, 736, 746.

The intensifiers 720, 730, 740 may have a plunger 727, 737, 747 which may have an external cross-sectional area equal to Aca, Acb, Acc and may have an interior which forms the process medium chamber 723, 733, 743. The plunger 727, 737, 747 may physically separate the control medium from the process medium. The plunger 727, 737, 747 may have a stroke Sa, Sb, Sc having a zero-displacement starting position when the control medium chamber 721, 731, 741 is substantially void of the control medium. The plunger 727, 737, 747 may have a stroke Sa, Sb, Sc having a full displacement ending position when the process medium chamber 723, 733, 743 is substantially void of the process medium. The stroke Sa, Sb, Sc may extend from any position between the zero-displacement starting position and the full displacement ending position.

The intensifiers 720, 730, 740 may increase the process medium pressure in proportion to an intensifier amplification ratio Ria, Rib, Ric, which may be calculated by dividing the cross-sectional area Aca, Acb, Acc by the cross-sectional area Apa, Apb, Apc, such that Ria=Aca/Apa, Rib=Acb/Apb, and Ric=Acc/Apc. The intensifier amplification ratio Ria, Rib, Ric may be any ratio greater than 1 to produce an increase in the process medium pressure across the intensifiers 720, 730, 740. For example, when the Ria, Rib, Ric equals 2, the intensifiers 720, 730, 740 may increase the process medium pressure by a factor of 2 over the control medium pressure, such that the intensifiers 720, 730, 740 may produce a process medium pressure of about 2,000 psi when the control medium pressure is about 1,000 psi.

Each intensifier 720, 730, 740 may be designed with the intensifier amplification ratio Ria, Rib, Ric to generate a maximum process medium intensifier pressure, which is also known as the process medium transition pressure Pt. The intensifiers 720, 730, 740 may have the process medium transition pressures Pta, Ptb, Ptc. The last downstream intensifier in an intensification system, such as the intensifier 740 in the intensification system 700, may be designed to produce a process medium transition pressure Ptc greater than or equal to a process medium test pressure Ptest. Alternatively, if a process medium test pressure Ptest is less than or equal to a process medium transition pressure Pt of an upstream intensifier, the intensifiers located downstream from that intensifier may not need to be placed into operation in order for the intensification system 700 to produce the process medium test pressure Ptest.

Each of the intensifiers 720, 730, 740 in the intensification system 700 may have a greater intensifier amplification ration Ri than each of the upstream intensifiers, such that Ric>Rib>Ria. As such, each downstream intensifier may increase the process medium pressure over the process medium transition pressure Pt of each upstream intensifier.

Just as the intensifier amplification ratio Ri may be selected based on the process medium pressure requirements of each intensifier, the system amplification ratio Rs may be selected based on the process medium pressure requirements of the intensification system 700. Likewise, the number of intensifiers needed to produce the system amplification ratio Rs may be selected based on the process medium pressure requirements of the intensification system 700.

The intensification system 700 may comprise a process medium pilot-operated check valve 763*a*, 763*b* positioned between each intensifier 720, 730, 740, such that the process medium pilot-operated check valve 763*a* may be configured to fluidly couple to both the process medium intensifier outlet 725 and the process medium intensifier inlet 734, and the process medium pilot-operated check valve 763*b* may be configured to fluidly couple to both the process medium intensifier outlet 735 and the process medium intensifier inlet 744.

The intensification system 700 may be configured to fill a pressure vessel 790 with a pressurized process medium, such as for a purpose of testing the pressure vessel's 790 strength. The pressure vessel 790 may be a tank, a pipe, or the like. The pressure vessel 790 may be configured to fluidly couple to both a process medium fill valve 777 and a process medium purge valve 778. The process medium fill valve 777 may be configured to fluidly couple to the process medium system outlet 764.

The intensification system 700 may have at least process medium pressure sensor 774 configured to fluidly couple to the process medium system outlet 765 and may detect the process medium pressure. The intensification system 700 may have a programmable logic controller 775 configured to electrically couple to process medium pressure sensor 774. The programmable logic controller 775 may be configured to electrically couple to both the process medium fill valve 777 and the process medium purge valve 778 to open and close each of the valves.

The programmable logic controller 775 may be any computer configured to electrically couple with a plurality of input and output devices. The programmable logic controller 775 may be configured to execute a control system logic comprising at least one command. The programmable logic controller 775 may be configured to execute a control system logic comprising a sequence of commands. Programmable logic controllers are well known in the art and the programmable logic controller 775 is not particularly limited.

The intensification system 700 may have at least one proportional integration regulator 773*a*, 773*b*, 773*c* configured to couple electrically to both the programmable logic controller 775 and to the at least one control medium process control valve 772*a*, 772*b*, 772*c*. A command sent from the programmable logic controller 775 may operate the at least one proportional integration regulator 773*a*, 773*b*, 773*c* to regulate the at least one control medium process control valve 772*a*, 772*b*, 772*c*. The programmable logic controller 775 may receive and interpret a process medium pressure reading from the at least one process medium pressure sensor 774 to regulate the at least one control medium proportional control valve 772*a*, 772*b*, 772*c* and therefore produce the process medium test pressure Ptest.

The intensification system 700 may have a process medium purge pressure Pp that represents a process medium pressure at or below which it is safe to purge the intensification system 700 of the process medium. The plunger 727, 737, 747 may have a purge stroke Spa, Spb, Spc that represents a plunger stroke displacement at or below which it is safe to purge the intensification system 700 of the process medium. Optionally, the at least one control medium proportional control valve 772*a*, 772*b*, 772*c* may be regulated when the plunger 727, 737, 747 reaches the purge stroke Spa, Spb, Spc to slow down the return of the plunger 727, 737, 747 to the zero-displacement starting point and therefore prevent a potentially damaging fluid or mechanical shock to the intensification system 700.

Figure 7B:
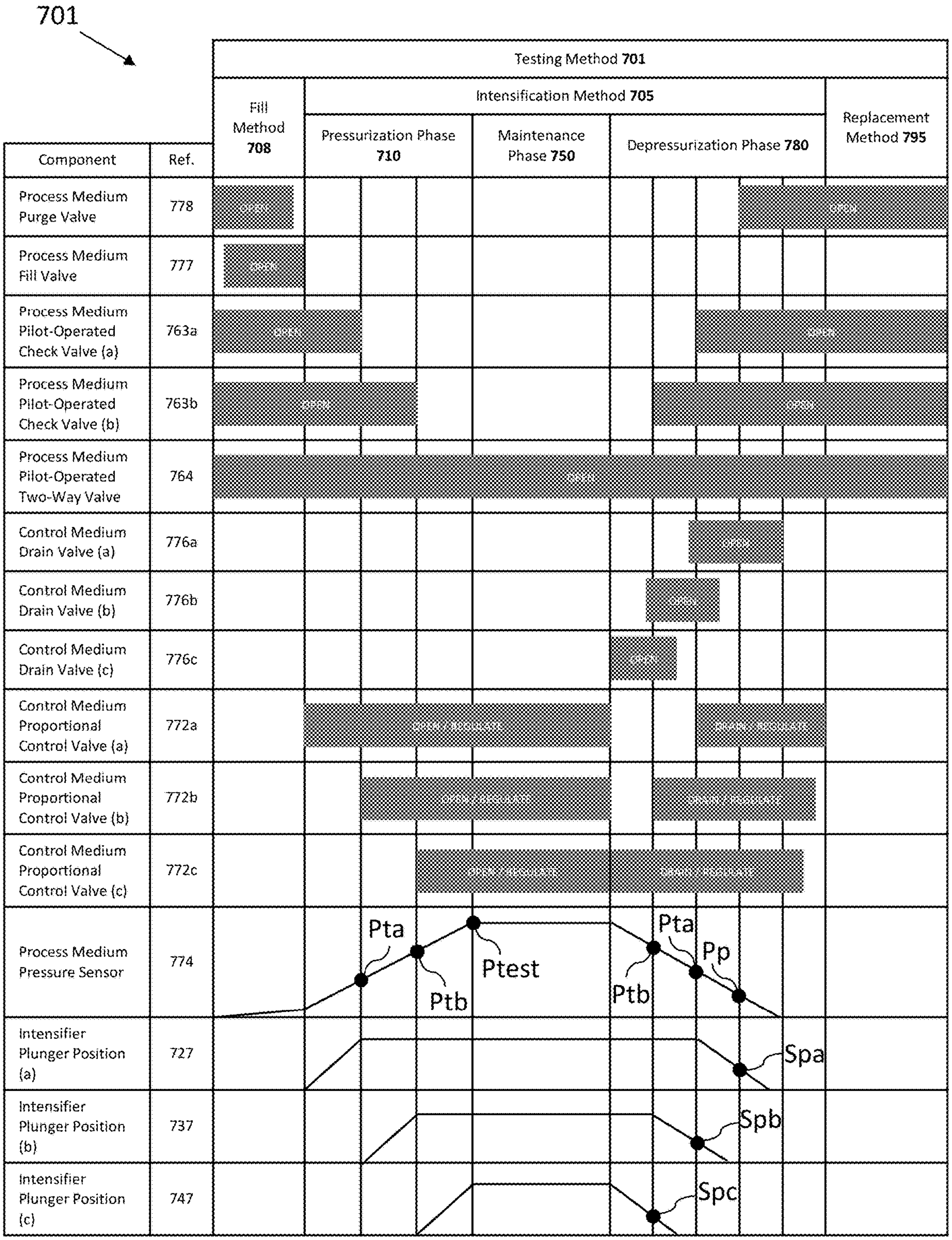
FIG. 7b illustrates a diagram of a testing method 701 having a fill method 708; a replacement method 795; and an intensification method 705 having a pressurization phase 710, a maintenance phase 750, a depressurization phase 780.

FIG. 7*b* illustrates a diagram of a testing method 701 having: a fill method 708; a replacement method 795; and an intensification method 705 having: a pressurization phase 710, a maintenance phase 750, and a depressurization phase 780. The components listed in FIG. 7*b* may be configured to at least one of: electrically couple to the programmable logic controller 775; fluidly couple to the at least one control medium power unit 771*a*, 771*b*; and fluidly couple to one another. The sequence of steps illustrated in FIG. 7*b* may be programmed as a sequence of commands to be executed by the programmable logic controller 775 to conduct the testing method 701.

During the fill method 708, the process medium purge valve 778 may be opened, then the process medium fill valve 777 may be opened, which may allow the process medium to fill the pressure vessel 790. At substantially the same time, or at a later time, the process medium pilot-operated check valves 763*a*, 763*b* and the process medium pilot-operated two-way valve 764 may be opened to allow the process medium to begin filling the intensification system 700. Alternatively, the process medium pilot-operated check valves 763*a*, 763*b* may remain closed during the fill method 708. The fill method 708 may continue until the pressure vessel 790 and the intensification system 700 are sufficiently filled to begin the intensification method 705. The process medium pilot-operated two-way valve 764 may remain open for the entirety of the testing method 701.

During the intensification method 705, the pressurization phase 710 may begin by opening and regulating the control medium proportional control valve 772*a* to pressurize the intensifier 720 to increase the process medium pressure to the process medium transition pressure Pta. The process medium pressure may be monitored by the process medium pressure sensor 774 for the entire duration of the testing method 701. When the process medium pressure reaches the process medium transition pressure Pta, the control medium proportional control valve 772*b* may be opened and regulated to pressurize the intensifier 730 to increase the process medium pressure to the process medium transition pressure Ptb. When the process medium pressure reaches the process medium transition pressure Ptb, the control medium proportional control valve 772*c* may be opened and regulated to pressurize the intensifier 740 to increase the process medium pressure to the process medium test pressure Ptest.

During the intensification method 705, the maintenance phase 750 may begin when the process medium pressure reaches the process medium test pressure Ptest. The control medium proportional control valve 772*a*, 772*b*, 772*c* may remain open and be regulated to maintain the process medium test pressure Ptest for a specified test duration period. At the end of the test duration period, the maintenance phase 750 may end and the control medium proportional control valve 772*a*, 772*b*, 772*c* may be closed.

During the intensification method 705, the depressurization phase 780 may begin by opening the control medium drain valve 776*c* to depressurize the intensifier 740. Next, the control medium drain valve 776*b* may be opened to depressurize the intensifier 730 when the process medium pressure decreases to a point that is near, but does not reach, the process medium transition pressure Ptb. Next, when the process medium pressure decreases to the process medium transition pressure Ptb, the process medium pilot-operated check valve 763*b* may be opened to allow the process medium pressure to begin decreasing in the intensifier 730. Next, the control medium drain valve 776*a* may be opened to depressurize the intensifier 720 when the process medium pressure decreases to a point that is near, but does not reach, the process medium transition pressure Pta. Next, when the process medium pressure decreases to the process medium transition pressure Pta, the process medium pilot-operated check valve 763*a* may be opened to allow the process medium pressure to begin decreasing in the intensifier 720. The process medium pressure may be monitored until it decreases to a process medium purge pressure Pp, at which time the process medium purge valve 778 may be opened to begin purging the remaining process medium from the intensification system 700.

The word "near" may mean within a certain percentage of the process medium transition pressure Pt. The certain percentage may be within 10%. The certain percentage may be within 5%. The certain percentage may be within any percent that fits within the design parameters of the intensification system 700.

During the intensification method 705, the depressurization phase 780 may continue with the process medium decreasing until the stroke Sp of the intensifier 740 decreases to the purge stroke Spc, at which time the control medium drain valve 776*c* may be closed and the control medium proportional control valve 772*c* may be drained and regulated in a partially open position to slow the decreasing stroke Sc of the intensifier 740. The partially open position of the control medium proportional control valve 772*c* may be accomplished by receiving a negative control signal sent by the programmable logic controller 775, which may direct the control medium proportional control valve 772*c* to slowly drain the process medium. The process medium pressure may continue to decrease in the intensifier system 700 until the stroke Sb of the intensifier 730 decreases to the purge stroke Spb, at which time the control medium drain valve 776*b* may be closed and the control medium proportional control valve 772*b* may be drained and regulated in a partially open position to slow the decreasing stroke Sb of the intensifier 730. The partially open position of the control medium proportional control valve 772*b* may be accomplished by receiving a negative control signal sent by the programmable logic controller 775, which may direct the control medium proportional control valve 772*c* to slowly drain the process medium. The process medium pressure may continue to decrease in the intensifier system 700 until the stroke Sa of the intensifier 720 decreases to the purge stroke Spa, at which time the control medium drain valve 776*a* may be closed and the control medium proportional control valve 772*a* may be drained and regulated in a partially open position to slow the decreasing stroke Sa of the intensifier 720. The partially open position of the control medium proportional control valve 772*a* may be accomplished by receiving a negative control signal sent by the programmable logic controller 775, which may direct the control medium proportional control valve 772*c* to slowly drain the process medium. The process medium may continue to purge from the intensification system 700 until the process medium pressure decreases to zero and the plunger stroke Sa, Sb, Sc decreases to the zero-displacement starting point, thereby ending the depressurization phase 780.

In one embodiment, the control medium proportional control valves 772*a*, 772*b*, 772*c* may be used to fill the control medium chambers 721, 731, 741 with the control medium, while the control medium drain valves 776*a*, 776*b*, 776*c* may be used to drain the control medium from the control medium chambers 721, 731, 741.

In one embodiment, the control medium proportional control valves 772*a*, 772*b*, 772*c* may be used to at least one of: fill the control medium chambers 721, 731, 741 with the control medium when receiving a positive control signal from the programmable logic controller 775; drain the control medium from the control medium chambers 721, 731, 741 when receiving a negative control signal from the programmable logic controller 775; and stop the flow of the control medium to the control medium chambers 721, 731, 741 when receiving no signal from the programmable logic controller.

During the testing method 701, the replacement method 795 may begin upon completion of the depressurization phase 780. During the replacement method 795, the pressure vessel 790 may be configured to fluidly decouple from the intensification system 700. The pressure vessel 790 may then be replaced with another pressure vessel 790 and the testing method 701 may be repeated. Alternatively, the pressure vessel 790 may not be replaced, thereby completing the testing method 701.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in the manufacturing of intensification products. To the extent that the term "selectively" is used in the specification or the claims, it is intended to refer to a condition of a component wherein a user of the apparatus may activate or deactivate the feature or function of the component as is necessary or desired in use of the apparatus. To the extent that the terms "operatively connected," "fluidly coupled," "mechanically coupled," and "electrically coupled" are used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments and aspects thereof, and while the embodiments and aspects have been described in considerable detail, it is not the intention of the applicant to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. An intensifier system, comprising:

at least two intensifiers configured to fluidly couple in series, each intensifier configured to increase a pressure of a process medium and comprising: a control medium chamber configured to fluidly couple to a control medium inlet and a process medium chamber configured to fluidly couple to both a process medium intensifier inlet and a process medium intensifier outlet, wherein an orientation of the process medium intensifier inlet represents an upstream direction relative to the intensifier and wherein an orientation of the process medium intensifier outlet represents a downstream direction relative to the intensifier;

a process medium inlet check valve configured to fluidly couple between a process medium system inlet and the process medium intensifier inlet of a first intensifier in the series;

at least one process medium pilot-operated check valve, wherein each process medium pilot-operated check valve is configured to fluidly couple between the process medium intensifier outlet of each upstream intensifier and the process medium intensifier inlet of each downstream intensifier;

a process medium pilot-operated two-way valve configured to fluidly couple between a process medium system outlet and the process medium intensifier outlet of a last intensifier in the series; and a control system, comprising:

at least one control medium power unit configured to fluidly couple to at least one control medium proportional control valve, wherein each of the intensifiers is configured to fluidly couple to one of the control medium proportional control valves;

at least one proportional integration regulator, wherein each of the proportional integration regulators is configured to electronically couple to one control medium proportional control valve; and at least one process medium pressure sensor configured to detect a process medium pressure at the process medium system outlet; and a programmable logic controller configured to execute a control system logic comprising a sequence of commands, comprising:

during a pressurization phase, pressurizing each of the intensifiers in sequence from the first intensifier in the series to the last intensifier in the series, wherein each intensifier is pressurized until the process medium pressure reaches the lesser of a process medium test pressure and a process medium transition pressure, wherein the at least one process medium pilot-operated check valve that is configured to fluidly couple to a respective process medium intensifier inlet of a respective downstream intensifier being pressurized is operated in a closed position when the respective downstream intensifier is being pressurized;

during a depressurization phase, depressurizing each of the intensifiers in sequence from the last intensifier in the series to the first intensifier in the series, wherein each intensifier is depressurized until the process medium pressure nears, but does not reach, the process medium transition pressure of a respective upstream intensifier in the series, wherein the at least one process medium pilot-operated check valve that is configured to fluidly couple to the respective process medium intensifier inlet of the respective downstream intensifier being depressurized is operated in a closed position during the depressurization phase of each intensifier and is operated in an open position after the respective downstream intensifier has been depressurized; and depressurizing all the intensifiers until the process medium pressure reaches zero.

2. The intensifier system of claim 1, further comprising:

performing a maintenance phase between the pressurization phase and the depressurization phase, comprising:

monitoring the process medium pressure;

controlling the at least one proportional integration regulator;

regulating the at least one control medium proportional control valve by controlling the at least one proportional integration regulator with the programmable logic controller; and maintaining the process medium pressure at the process medium test pressure.

3. The intensifier system of claim 1, wherein the last intensifier in the series is configured to generate a maximum process medium pressure equal to or greater than the process medium test pressure, and wherein each intensifier located elsewhere in the series is configured to generate a process medium transition pressure that is less than the process medium transition pressure of the last intensifier in the series.

4. The intensifier system of claim 1, wherein the at least two intensifiers is two intensifiers, and wherein the at least one process medium pilot-operated check valve is one process medium pilot-operated check valve.

5. The intensifier system of claim 1, wherein the at least two intensifiers is three intensifiers, and wherein the at least one process medium pilot-operated check valve is two process medium pilot-operated check valves.

6. The intensifier system of claim 1, wherein at least one of the intensifiers is a plunger-type intensifier.

7. The intensifier system of claim 1, wherein at least one of the intensifiers is a cylinder-type intensifier.

8. The intensifier system of claim 1, wherein the intensifiers are mechanically coupled as a single unit.

9. The intensifier system of claim 1, wherein the intensifiers are mechanically decoupled as separate units.

10. The intensifier system of claim 1, wherein the at least one process medium pilot-operated check valve comprises a bypass cylinder, and wherein the bypass cylinder is configured to be controlled by the programmable logic controller and bypass the at least one process medium pilot-operated check valve when the at least one process medium pilot-operated check valve is in the open position.

11. A method for operating an intensifier system for a process medium, comprising:

controlling a control medium of the intensifier system with a programmable logic controller, wherein the programmable logic controller is configured to control a pressurization phase and a depressurization phase;

during the pressurization phase, pressurizing a first, upstream intensifier until a process medium pressure nears a process medium transition pressure, wherein the process medium transition pressure is the maximum process medium pressure generated by the first, upstream intensifier; and pressurizing a second downstream intensifier until the process medium pressure reaches a process medium test pressure, wherein process medium pilot-operated check valve is configured to fluidly couple in series between the first, upstream intensifier and the second, downstream intensifier, wherein the process medium pilot-operated check valve is operated by the programmable logic controller in a closed position during the pressurization of the downstream intensifier;

during the depressurization phase, depressurizing the downstream intensifier;

opening the process medium pilot-operated check valve with the programmable logic controller when the process medium pressure nears, but does not reach, the process medium transition pressure of the first upstream intensifier; and depressurizing both of the intensifiers until the process medium pressure reaches zero.

12. The method of claim 11, further comprising:

a pressure sensor configured to fluidly couple to a process medium system outlet and measure the process medium pressure;

a control medium proportional control valve configured to pressurize each intensifier;

a proportional integration regulator configured to control each control medium proportional control valve;

wherein the programmable logic controller is configured to control each proportional integration regulator; and during the pressurization phase, controlling the proportional integration regulator by the programmable logic controller to operate the control medium proportional control valve, wherein operating the control medium proportional control valve in an open position increases the process medium pressure, and wherein operating the control medium proportional control valve in a drain position decreases the process medium pressure.

13. The method of claim 11, wherein the programmable logic controller is configured to control a maintenance phase;

the method further comprising:

performing the maintenance phase between the pressurization phase and the depressurization phase, comprising:

monitoring the process medium pressure;

controlling the proportional integration regulator;

regulating the control medium proportional control valve by controlling the proportional integration regulator with the programmable logic controller; and maintaining the process medium pressure at the process medium test pressure.

14. The method of claim 12, wherein the process medium pilot-operated check valve comprises a bypass cylinder, and wherein the bypass cylinder is configured to be controlled by the programmable logic controller and bypass the process medium pilot-operated check valve when the process medium pilot-operated check valve is in the open position;

wherein each intensifier comprises at least one of a piston, a rod, and a plunger, wherein at least one of the piston, the rod, and the plunger are configured to transmit a pressure between the control medium and the process medium; and the method further comprising in the depressurization phase:

controlling a return of at least one of the piston, the rod, and the plunger to a zero-displacement starting position with the control medium proportional control valve.

15. The method of claim 14, wherein the intensifier system is depressurized without the use of an additional depressurization valve positioned between a process medium outlet and a fluidly coupled pressure vessel.

16. A method for testing a pressure vessel with an intensifier system, comprising:

fluidly coupling the pressure vessel to the intensifier system, wherein the intensifier system comprises at least one upstream intensifier, at least one downstream intensifier, and a process medium pilot-operated check valve fluidly coupled between each intensifier, wherein the process medium pilot-operated check valve comprises a bypass cylinder, and wherein the bypass cylinder is configured to be controlled by a programmable logic controller and bypass the process medium pilot-operated check valve when the process medium pilot-operated check valve is in the open position;

controlling operation of the intensifier system with the programmable logic controller, wherein the programmable logic controller is configured to control a fill method, an intensification method, and a replacement method;

the fill method comprising:

opening a process medium purge valve;

opening a process medium fill valve;

opening a process medium pilot-operated two-way valve; and filling the pressure vessel to a desired level with a process medium;

the intensification method comprising:

a pressurization phase, a maintenance phase, and a depressurization phase, wherein the depressurization phase comprises:

depressurizing the at least one downstream intensifier;

opening the process medium pilot-operated check valve when the pressure of the at least one downstream intensifier nears, but does not reach, a process medium transition pressure of the at least one upstream intensifier; and depressurizing both the at least one downstream intensifier and the at least one upstream intensifier together until a process medium pressure reaches zero; and the replacement method comprising:

fluidly decoupling the pressure vessel from the intensifier system, and either:

replacing the pressure vessel with an additional pressure vessel and repeating the method for testing on the additional pressure vessel, or completing the method for testing and draining the process medium from the intensifier system.

17. The method for testing the pressure vessel with the intensifier system of claim 16, wherein each intensifier comprises:

at least one of a piston, a rod, and a plunger, wherein at least one of the piston, the rod, and the plunger are configured to:

transmit a pressure between a control medium and the process medium, and stroke from a zero-displacement starting position to a full-displacement ending position;

an intensifier amplification ratio Ri that is greater than the intensification amplification ratio Ri of each of the respective upstream intensifiers, wherein the intensifier amplification ratio Ri of each intensifier is calculated by dividing a cross-sectional area Ac of a control medium chamber by a cross-sectional area Ap of a process medium chamber;

a control medium drain valve configured to drain the control medium from the control medium chamber;

a control medium proportional control valve configured to operate the control medium drain valve upon receiving commands from the programmable logic controller; and a process medium pressure sensor configured to detect the pressure of the process medium;

a process medium purge valve configured to purge the process medium from the intensifier system; and wherein the pressurization phase further comprises:

monitoring the process medium pressure sensor;

opening and regulating the control medium proportional control valve of respective upstream intensifier to increase the process medium pressure to a process medium transition pressure Pta of the respective upstream intensifier; and opening and regulating the control medium proportional control valve of a respective downstream intensifier to increase the process medium pressure to the greater of:

a process medium transition pressure Ptb, or a process medium test pressure Ptest.

18. The method for testing the pressure vessel with the intensifier system of claim 17, wherein the maintenance phase begins when the process medium pressure reaches the process medium test pressure Ptest and comprises:

regulating the control medium proportional control valve of the respective downstream intensifier to maintain the process medium test pressure Ptest for a specified test duration period, and closing the control medium proportional control valve of the respective downstream intensifier at the end of the test duration period.

19. The method for testing the pressure vessel with the intensifier system of claim 17, wherein the depressurization phase further comprises:

opening the control medium drain valve of the respective downstream intensifier to depressurize the respective downstream intensifier;

opening the control medium drain valve of the respective upstream intensifier to depressurize the respective upstream intensifier when the process medium pressure decreases to a point that is near, but does not reach, the process medium transition pressure of the respective upstream intensifier;

opening the process medium pilot-operated check valve when the process medium pressure decreases to the process medium transition pressure of the respective upstream intensifier; and monitoring the process medium pressure until the process medium pressure decreases to a process medium purge pressure Pp, at which time the process medium purge valve may be opened to purge the process medium from the intensifier system.

20. The method for testing the pressure vessel with the intensifier system of claim 19, wherein the depressurization phase further comprises:

decreasing the process medium pressure until the stroke of the respective downstream intensifier decreases to a purge stroke of the respective downstream intensifier;

closing the control medium drain valve of the respective downstream intensifier;

regulating the control medium proportional control valve of the respective downstream intensifier in a partially open position to slow the decreasing stroke of the respective downstream intensifier;

further decreasing the process medium pressure until the stroke of the respective upstream intensifier decreases to a purge stroke of the respective upstream intensifier;

closing the control medium drain valve of the respective upstream intensifier;

regulating the control medium proportional control valve of the respective upstream intensifier in a partially open position to slow the decreasing stroke of the respective upstream intensifier; and purging the remaining process medium from the intensifier system until the process medium pressure reaches zero and the stroke of each intensifier decreases to the zero-displacement starting position.

* * * * *